(12) United States Patent
Wu et al.

(10) Patent No.: US 11,361,137 B2
(45) Date of Patent: Jun. 14, 2022

(54) INTEGRATED SIMULATOR AND ANALYSIS AND OPTIMIZATION ENGINE

(71) Applicant: Siemens Industry Software Inc., Plano, TX (US)

(72) Inventors: Yang Wu, Los Altos Hills, CA (US); Ping-San Tzeng, Fremont, CA (US); Geng Bai, ShenZhen (CN); Chao-Yung Wang, Taipei (TW); Wen Kung Chu, San Jose, CA (US)

(73) Assignee: Siemens Industry Software Inc., Plano, TX (US)

( * ) Notice: Subject to any disclaimer, the term of this patent is extended or adjusted under 35 U.S.C. 154(b) by 94 days.

(21) Appl. No.: 16/915,549

(22) Filed: Jun. 29, 2020

(65) Prior Publication Data

US 2021/0383045 A1 Dec. 9, 2021

Related U.S. Application Data

(60) Provisional application No. 63/034,329, filed on Jun. 3, 2020.

(51) Int. Cl.
*G06F 30/33* (2020.01)
*G06F 30/31* (2020.01)
*G06F 30/337* (2020.01)
*G06F 30/3308* (2020.01)
*G06F 119/06* (2020.01)

(52) U.S. Cl.
CPC .......... *G06F 30/337* (2020.01); *G06F 30/31* (2020.01); *G06F 30/3308* (2020.01); *G06F 2119/06* (2020.01)

(58) Field of Classification Search
CPC ..... G06F 30/31; G06F 30/3308; G06F 30/337
USPC ................................. 716/100, 101, 106, 132
See application file for complete search history.

(56) References Cited

U.S. PATENT DOCUMENTS

| 8,555,243 | B2* | 10/2013 | Correll et al. ........... G06F 8/20 717/105 |
| 8,726,228 | B2* | 5/2014 | Ravindran ............... G06F 8/34 717/105 |
| 9,335,977 | B2* | 5/2016 | Wang et al. ......... G06F 9/4494 |
| 9,836,567 | B2* | 12/2017 | Berkovitz et al. ...... G06F 30/33 |
| 2008/0244476 | A1* | 10/2008 | Fotakis et al. .......... G06F 30/33 716/132 |

OTHER PUBLICATIONS

Hashimoto et al., "A Practical Gate Resizing Technique Considering Glitch Reduction for Low Power Design", Proceedings of the 36th annual Design Automation Conference, Jun. 1999.

(Continued)

*Primary Examiner* — Sun J Lin

(57) ABSTRACT

A signoff process includes: accessing circuit information of a circuit; performing, using an analysis and optimization engine, power analysis and optimization on the circuit to generate an optimized circuit, the power analysis and optimization being performed using an input pattern; performing, using a simulator, a simulation on at least a portion of an optimized circuit, the simulation being performed using the input pattern used in the power analysis and optimization; and outputting a simulation result to the analysis and optimization engine; wherein the analysis and optimization engine and the simulator are integrated.

23 Claims, 6 Drawing Sheets

(56) References Cited

OTHER PUBLICATIONS

Lim et al., "Statistical Estimation of Delay-Dependent Switching Activities in Embedded CMOS Combinational Circuits", IEEE Trans. on Very Large Scale Integration (VLSI) Systems, vol. 5, No. 3, Sep. 1997.

Sayed et al., "A New Statistical Approach for Glitch Estimation in Combinational Circuits", IEEE Internal Symposium on Circuits and Systems, May 2007.

\* cited by examiner

INTEGRATED SIMULATOR AND ANALYSIS AND OPTIMIZATION ENGINE

CROSS REFERENCE TO OTHER APPLICATIONS

This application claims priority to U.S. Provisional Patent Application No. 63/034,329 entitled GLITCH POWER ANALYSIS AND OPTIMIZATION ENGINE filed Jun. 3, 2020 which is incorporated herein by reference for all purposes.

BACKGROUND OF THE INVENTION

With new advancements in semiconductor technology such as FinFET, circuit leakage power is greatly reduced. As a result, dynamic power becomes a more significant portion of a circuit's total power consumption.

To achieve low power design, implementation tools such as the place & route (P&L) tool should consider dynamic power during its optimization flow. Dynamic power is power consumed while the circuit components (e.g. logic gates) are active (e.g., during the rise or fall transition). Because logic gate and interconnect wire have non-zero delay, many logic gates may have multiple toggles before they reach steady logic state in each clock cycle. The dynamic power triggered by these non-functional toggles are called glitch power.

To reduce dynamic power (include glitch power), an existing place and route systems typically runs full-scale simulation of the circuit and provides outputs in a Value Change Dump (VCD) file to an analysis and optimization tool, which makes optimization changes to the circuit. Design changes are often made iteratively. Thus, full-scale simulation is re-run on the optimized circuit to update the VCD, so the optimizer can make further optimization changes.

Due to the large scale of modern semiconductor design, a full-scale simulation can be done on billions of logic components and is very computationally intensive. An iteration of simulation-optimization can sometimes take several days. A more efficient way to perform simulation and support the analysis and optimization process is therefore needed.

BRIEF DESCRIPTION OF THE DRAWINGS

Various embodiments of the invention are disclosed in the following detailed description and the accompanying drawings.

DETAILED DESCRIPTION

Figure 1:
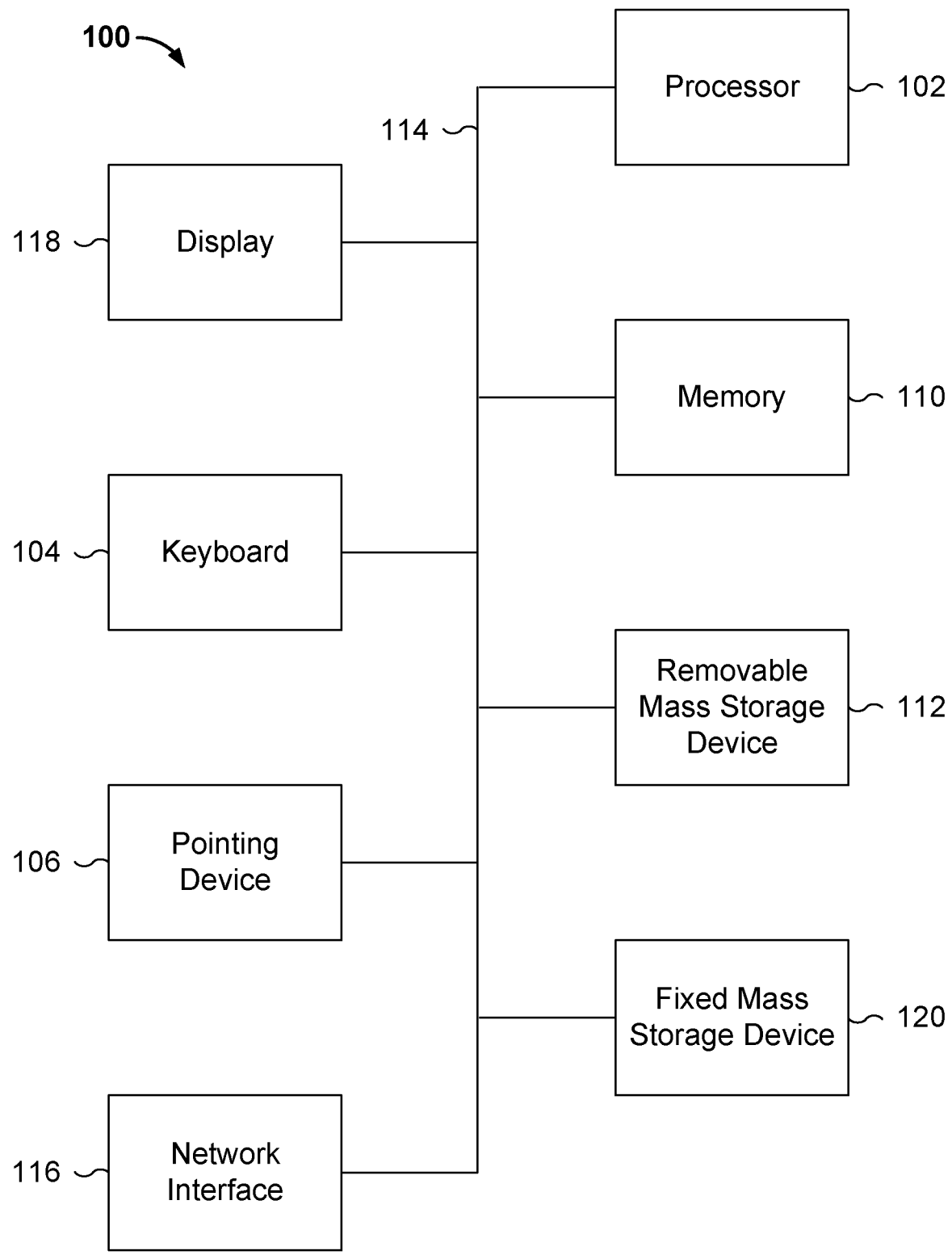
FIG. 1 is a block diagram illustrating an embodiment of a system for providing power analysis, optimization, and simulation for semiconductor circuits.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic power such as circuit glitch power strongly depends on input patterns. In order to get accurate toggle information of all logic gate, the circuit undergoes thousands to millions of cycles of simulation with different input patterns. The resulting simulated switching activity information (e.g., toggle information on the pins) can be saved to serve as the "golden value" for the circuit. One popular format to save such file is called VCD (Value Change Dump) file. Currently, most signoff power analysis tools read in VCD file to perform power analysis. In existing systems, statistical techniques are often used to analyze dynamic power. An optimizer then uses the analysis result to determine changes to the circuit (also referred to as OPT moves) that will reduce power consumption, such as deleting buffers, changing the size of gates, etc. However, the statistical technique may introduce inaccuracy to the golden value. After multiple OPT moves, the inaccuracy in the switching activity information will accumulate. In order to keep the inaccuracy down, after a certain number of OPT moves, simulation is run again to regenerate the golden value. Given the sheer number of gates and states in the modern semiconductor circuit, re-running the simulation tool on the full circuit with the OPT moves is very time consuming and can slow down the overall signoff process significantly.

An improved signoff system is disclosed. The system includes an analysis and optimization engine and a simulator that are integrated and configured with the capability of communicating with each other. The simulator is configured to perform full-scale as well as incremental simulation.

FIG. 1 is a block diagram illustrating an embodiment of a system for providing power analysis, optimization, and simulation for semiconductor circuits.

As will be apparent, other computer system architectures and configurations can be used to perform power analysis, optimization, and simulation. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide power analysis, optimization, and simulation functions.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized. For example, a cloud-based architecture can be used in some embodiments, where the analysis, optimization, and simulation functions are provided by a cloud platform, and display and interaction interfaces are provided by a client.

Figure 2:
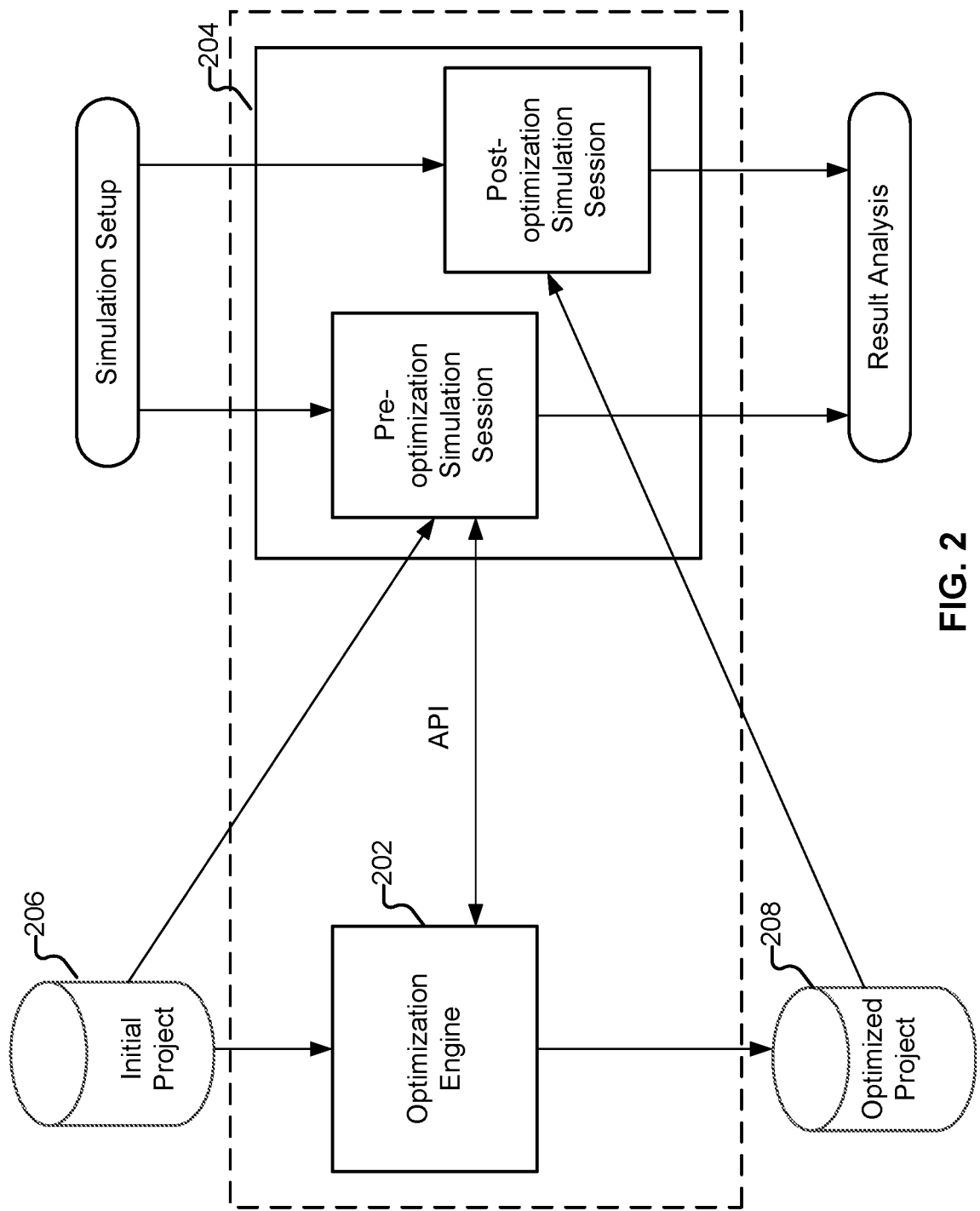
FIG. 2 is a block diagram illustrating an embodiment of a system with an integrated simulator and analysis and optimization engine.

FIG. 2 is a block diagram illustrating an embodiment of a system with an integrated simulator and analysis and optimization engine. The analysis and optimization engine is sometimes referred to as the optimization engine or OPT engine. In this example, system 200 is used in the signoff process where a semiconductor design undergoes multiple iterations of analysis, optimization, and simulation to reduce power consumption. The system includes an optimization engine 202 and a simulator 204. Optimization engine 202 performs power analysis on the circuit, and makes optimization moves on the circuit based on the analysis results to improve power consumption of the circuit. An example of optimization engine 202 is the Aprisa™ system by Avatar Integrated Systems. Other optimization tools can be used.

An initial project 206 can include circuit information of an initial circuit's logic structure, such as a netlist with logic components. In various embodiments, the initial project can further include switching activity information such as: timing information, input patterns, output waveforms, setting information (e.g., runtime configuration information, delay models, timing constraints, etc.) For purposes of discussion, in the following examples, the initial switching activity information is provided as VCD files. A VCD is an ASCII-based format for dumpfiles generated by design tools, and is defined in IEEE Standard 1364-1995 and IEEE Standard 1364-2001. In alternative embodiments, a FSDB (Fast Signal Database), WLF (Wave Log File), SHM (Stimulus File), VPD (binary value dump), SAIF (Switching Activity Interface Format) file, or any other signal/switching activity report may be used without limitation. A signoff power analysis tool may read in a VCD file or other file to perform power analysis. It may also base the power analysis on the simulator's direct output, without relying on the VCD file. Based on initial project 206, the optimization engine can perform the analysis and optimization to generate an optimized project 208 in which the logic and/or layout of the initial circuit are adjusted to reduce power consumption.

The simulator is configured to simulate the circuit's behavior given simulation setup information including circuit information (e.g., netlist of the circuit), input patterns (also referred to as input stimuli or input vectors), and setting information (e.g., runtime environment, delay models, timing constraints, etc.). In some embodiments, the simulator is implemented as a Verilog-based simulator. The simulator implements standard simulation features such as simulating the circuit's operations given a set of inputs, as well as additional features that facilitate the optimization engine's operations and improve the simulator's efficiency. In this example, the simulator supports multiple modes of operation. In a full-scale mode, the simulator generates simulated switching activity information (e.g., billions of events) on the circuit and stores them (e.g., as VCD files). This mode creates a large amount of simulation data that can be used for further power analysis (e.g., analysis of glitch toggles) performed by downstream tools. In an incremental mode, the simulator communicates with the optimization engine and performs simulation incrementally (e.g., in increments of time and/or area) to generate input patterns and collect output waveform data. As will be described in greater detail below, the simulator and the optimization engine can communicate and interact through application programming interfaces (APIs). Control messages and simulation results can be exchanged using the APIs. Incremental simulation is much faster than full-scale simulation because a much smaller set of simulation computations is needed by the former. In this example, the simulator performs a pre-optimization simulation session in full-scale mode and additional post-optimization simulation session(s) in incremental mode.

The simulator is configured to obtain simulation setup information using the initial project. In the event that the initial project does not have all the input information required for the simulation to run (for example, the input patterns is missing), the simulator can determine the full input data (e.g., by extracting or deriving the input pattern from the original seed VCD, or by using a randomized pattern).

Once the setup information is obtained, the simulator runs a pre-optimization simulation on the full circuit. When the pre-optimization simulation session is run, the differences in setup information used by the simulator and original VCD would cause the output of the simulator to be different from the output that is included in the initial project. Based on the differences in the outputs, the simulator can derive the setup information, save the derived setup information, and use the same setup information consistently in subsequent simulations. Since pre-optimization simulation is performed on the full circuit, it tends to be a lengthy process (e.g., 10-20 hours).

Once the optimizer runs its analysis and optimization, it will notify the simulator of the areas subject to optimization. Thereafter, the simulator can run post-optimization simulation incrementally to provide updated simulation information on subsections of the circuit, over specified time periods. Because the incremental simulation is only run on a portion of the circuit and typically only for a short time period, the amount of computation required to run the incremental simulation is much less, and the computation may be instantly completed. This is a vast improvement over existing systems, where full-scale simulation needs to be run each time the optimizer makes updates.

In this example, optimization engine 202 and a simulator 204 are integrated. In other words, optimization engine 202 and simulator 204 are configured to have the capability of communicating with each other. In particular, the simulator is configured to send simulation results to the optimization engine, and the optimization engine is configured to control the simulator to perform certain actions such starting, stopping, pausing, resuming, generating input stimuli, outputting simulation results, obtaining simulation results, etc. The control functions can be performed without requiring the VCD files. In some embodiments, the simulator supports the communication by providing application programming interfaces (APIs). The APIs can be implemented using programming language function calls as well as various event/message based communication protocols and/or libraries (e.g., Tcl/Tk). As will be described in greater detail below, in response to the API calls, the simulator allows incremental simulation for the optimization engine in a step-by-step fashion (e.g., simulating the states of the circuit at specified time cycles) without having to rerun the simulation session starting from logic time 0. The simulator also allows localized simulation for local changes and evaluation power of the optimized circuit for localized window areas. In other words, the optimization engine can make some optimization moves (e.g., changing a few gates in one area), then request the simulator to go back a few time steps to an earlier event at time Tg and run simulation again based on the changed circuit starting at time Tg. The simulation can also be run on only a localized area of the circuit that includes the changes.

Figure 3:
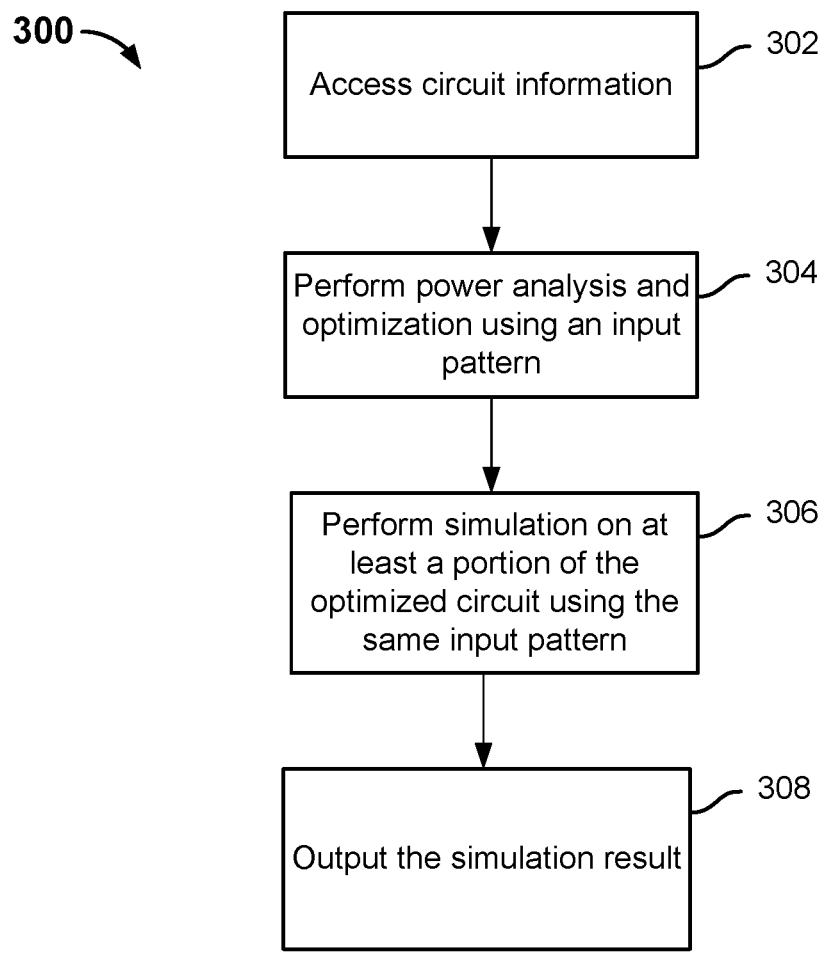
FIG. 3 is a flowchart illustrating an embodiment of a signoff process.

FIG. 3 is a flowchart illustrating an embodiment of a signoff process. Process 300 can be performed by a system such as 200, as pre-optimization simulation or post-optimization simulation.

At 302, circuit information of a circuit is accessed. The circuit information includes high level logic information such as netlists, and whenever possible low level layout information and/or other related information that can be used to compute circuit timing. Simulated switching activities (such as the VCD files with input waveforms) are optionally included in some embodiments. The circuit information can be accessed by reading from a file, reading from a data stream, inputting from a data source, or other appropriate techniques.

Figure 4:
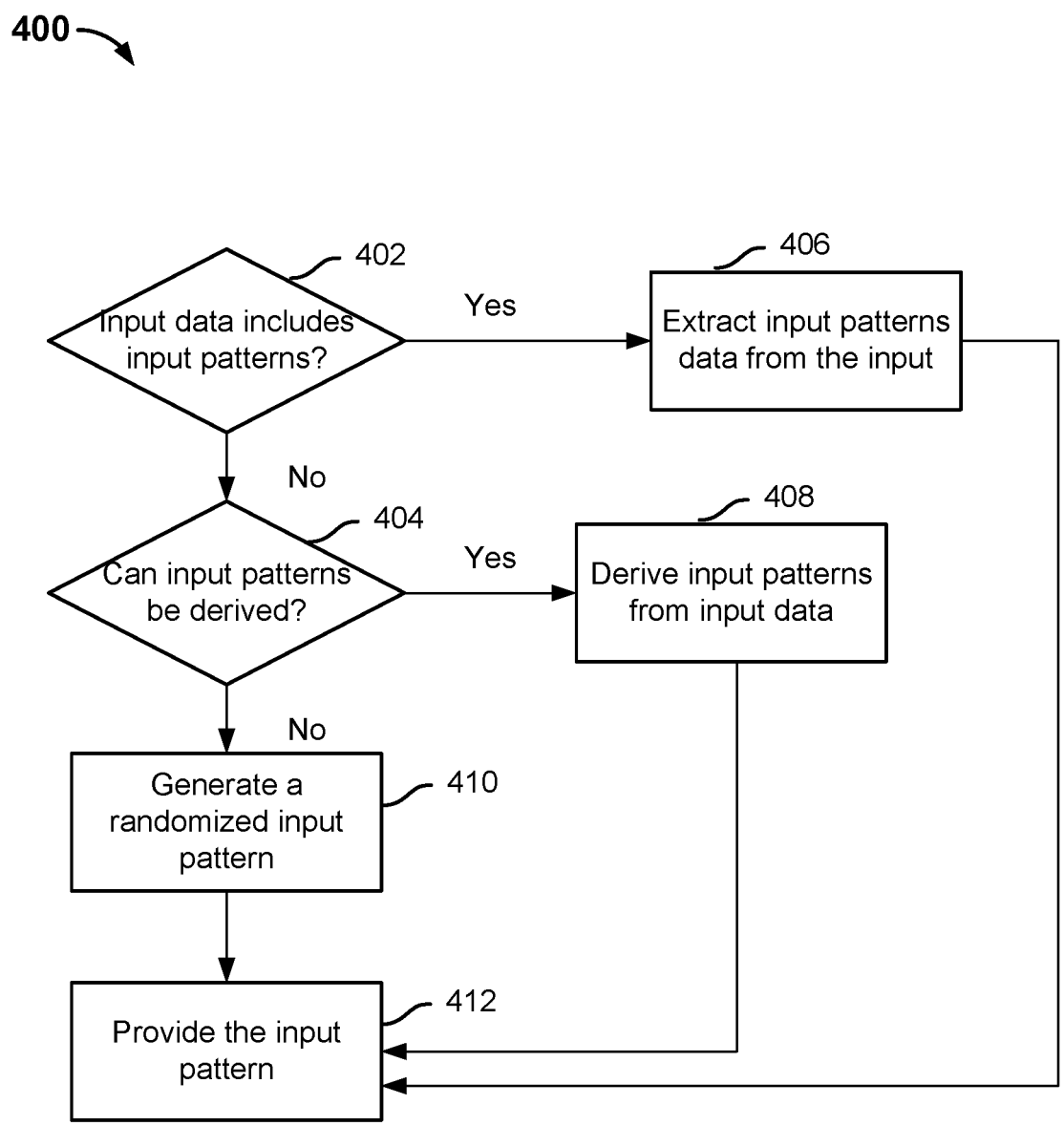
FIG. 4 describes an embodiment of a process of generating the input pattern.

At 304, using an analysis and optimization engine, power analysis and optimization are performed on the initial circuit to generate an optimized circuit. The power analysis and optimization are performed using an input pattern (also referred to as an input vector). FIG. 4 describes an embodiment of a process of generating the input pattern. The power analysis and optimization can be performed by a standard optimization system such as Aprisa™ In some embodiments, the power analysis analyzes dynamic power of the circuit, including glitch power.

At 306, using a simulator, a simulation is performed on at least a portion of an optimized circuit, using the same input pattern. The simulation can be performed on the entire circuit, such as when the simulation is a pre-optimization simulation. The simulation can also be performed incrementally (e.g., for a limited number of time steps and/or on a localized area of the optimized circuit) to reduce the amount of computation. In some embodiments, full-scale simulation is used for pre-optimization simulation and incremental simulation is used for post-optimization simulation. Multiple simulations can be performed based on different optimization scenarios.

At 308, one or more simulation results are output. In some embodiments, the simulation result is output to the OPT engine. The simulation result can be used in the initial optimization, or, after optimization is completed, serve as a validation of whether certain optimization moves are valid and/or determine whether to accept a set of one or more optimization moves. For example, multiple optimization scenarios can be simulated to obtain multiple simulation results, which are sent to the optimization engine. The OPT engine compares the simulation results, and selects the set of optimization moves to provide the top simulation result(s). Alternatively, the simulator can perform the comparison of the results and send information about the comparison to the OPT engine. The selected set of optimization moves are kept and other optimization moves are discarded.

In this example, the analysis and optimization engine and the simulator are integrated so they may communicate interactively with each other, in a manner described above in connection with FIG. 2. In addition to performing pre-optimization and post-optimization simulations, the simulation can also be running during the optimization process, responding to optimization engine queries and providing feedback on possible choices of moves.

304-306 can be performed concurrently. For example, the simulator does not need to wait for the full optimization to complete. Rather, the optimizer can make a set of optimization moves, invoke the simulator to do incremental simulation on portions of the optimized circuit, evaluate which optimization moves to keep based on simulation results, and continue with further optimization. Process 300 can be iterated multiple times.

The simulator is configured to be able to perform simulation with various types of input data. The input data is used to generate the input patterns (also referred to as input stimuli, input vectors, simulation events, or toggle data) used to run the simulation. Preferably, the input patterns represent the typical power characteristics of the design.

FIG. 4 is a flowchart illustrating an embodiment of a process of generating input patterns. Process 400 can be performed by a simulator such as 204 to obtain simulation setup information.

At 402, it is determined whether the input data (such as the original seed VCD included in the initial project) includes predefined input patterns that mimic the usage scenario in real applications. If yes, at 406, the simulator extracts the input pattern data from the input data, and provides the input patterns at 412 to run simulations. An output from a simulation run using this type of input data should match the output of the initial design. Once the optimizer has made optimization moves, however, the simulator's output would deviate from the original VCD output.

If the input data does not include input pattern from the original seed VCD from the initial design, at 404, it is determined whether the input pattern information can be derived. If yes, the input pattern information is derived from the input data, at 408. In particular, if the original seed VCD has only output data (e.g., the original seed VCD output logic value sequences), such output data can be used to derive the input logic value sequences through constraint satisfaction techniques such as backtracking and back propagation for combinational logic. In some embodiments, BBD Engine and/or SAT Engine can be used to implement the constraint satisfaction techniques and derive the input logic value sequences. In some embodiments, formal methods such as quick symbolic simulation or partial state machine unrolling are applied to regenerate the sequences of input patterns based on the original seed VCD output logic value sequences.

In some cases, there is no input data/VCD data available, or the input pattern information cannot be extracted from the input data, or the input pattern information cannot be derived from the input data/VCD data (e.g., because of missing output data or because the techniques used for derivation requires complex computations). In such cases, a randomized input vector is generated at 410 and provided as the input patterns at 412. The randomized input vector is preferably generated to conform to the characteristics of the circuit. For example, at a functional level, a randomized input to a USB circuit and a randomized input to a PCIe circuit would have different data patterns in practice due to the different characteristics of the designs. At an implementation level, a data path pin and a clock path pin would also have different data patterns in practice. To facilitate the generation of random patterns, in some embodiments, a predefined mapping of data patterns and corresponding circuit types is stored. In some embodiments, the simulator analyzes the circuit architecture and predicts data distribution, determines a circuit type associated with the design, then selects a corresponding data pattern based on the determined circuit type. In some embodiments, a user interface is provided to a user to input the type of circuit and/or input pattern desired. In some embodiments, a combination of the techniques is used.

When generating a random input pattern for the simulator, the simulation continues to run as long as the input pattern is non-zero. The longer the simulation runs, the more accurate it is at generating the VCD. However, it is sometimes unnecessary for the simulation to run a long time to achieve the desired accuracy. Thus, in some embodiments, an automatic toggle rate convergence checker is used to monitor the toggle rate and stop the simulation when it determines that the toggle rate of each observed pin is converging and stabilizing.

For a given pin, the toggle rate R is measured as:

$R=TG_p/TG_{total}$, where $TG_p$ is the number of toggles for the pin, and $TG_{total}$ is the total number of toggles. Both values can be maintained by the automatic toggle rate convergence checker.

The toggle rate R should converge over time. In other words, the longer the simulation is run, the more accurate the toggle rate is estimated. The automatic toggle rate convergence checker tests the toggle rate change over time. When the toggle rate change over a specific time period meets a threshold, convergence is determined to have been reached and the simulation can stop. In some embodiments, the simulation is stopped internally from the optimization tool by an API call.

In one aspect, the simulation is configured to incrementally evaluate the power of the most recent design changes rather than the full-scale design. The incremental simulation capability accelerates the simulation as well as the power analysis, since any optimization change can be applied to the design then immediately resume the simulation to the optimization step. In some embodiments, the simulation engine is configured to allow the simulation runs to stop, pause, and resume. This can be implemented by using specific APIs (e.g., based on messages and/or events) with callback functions that provide simulation constraints (e.g., incremental time steps, evaluation window of selected logic gates, etc.), and cause the simulation code to stop, pause, or resume. In some embodiments, the simulation engine is configured to be able to go back to a previous state (e.g., a previous simulation clock time or a previous event). This can be implemented by keeping track of time and/or events and the corresponding states of the circuit, and providing APIs with callback functions that cause the simulation code to return to the desired previous state.

In some embodiments, the simulator is implemented to perform event-driven simulations (also referred to as discrete simulations). An event is associated with a time, a state, and a location (e.g., which pin in the design). The simulation is configured to respond to control events and perform simulation according to the time, state, and location specified by the control events. In some embodiments, an anti-event is implemented to specify a previous event to be invalidated. The simulator is further configured to respond to anti-events and selectively erase a previous event. For example, an anti-event can specify time t3, pin 4, state 0. In response to this anti-event, the simulator will go back to time t3 and erase any previously-specified event at pin 4 and set the state of pin 4 to a current known value, then continue to run simulation starting at time t3 at pin 4 with the updated state.

In some embodiments, an anti-event kills incorrect simulations made in anticipation of future events. For example, while a free thread is waiting for other threads, the free thread can run extra simulations for the future by inputting two possible input values (1 and 0) to a gate and get two possible paths that lead to future results. When the prior dependent thread completes its processing and gives the actual result to the free thread (e.g., the actual input value is 1), the free thread will continue to run simulation for the path produced by the correct actual input, but use an anti-event to kill the simulation for the path produced by the incorrect input (e.g., the path generated by the input value of 0).

In another aspect, the simulator is configured to incrementally evaluate the power of a localized area on the circuit design. The OPT engine could make a number of optimization moves such as moving a gate, resizing a gate, deleting a buffer, etc. Each change would affect other gates in the circuit. To run full simulation on each change or combinations of changes would be very expensive computationally. To reduce the amount of computation needed, for an optimization move, a small area of affected gates is specified as a localized window area. The specification is based on an initial guess of which gates are affected and does not need to be precise. The simulator runs simulation on the localized window area, and compares the resulting power with that of the pre-simulation value. If the move does not result in a power improvement or the amount of improvement is below a threshold, it is discarded. An anti-event can be generated to bring the simulation state back to the point before the optimization move was made. If the move results in an improvement, it is kept, and may be incorporated into another simulation of a greater area. By doing evaluations on optimization moves incrementally in localized areas, a large number of moves can be pruned without having to run expensive large-scale or full-scale simulations.

Figure 5:
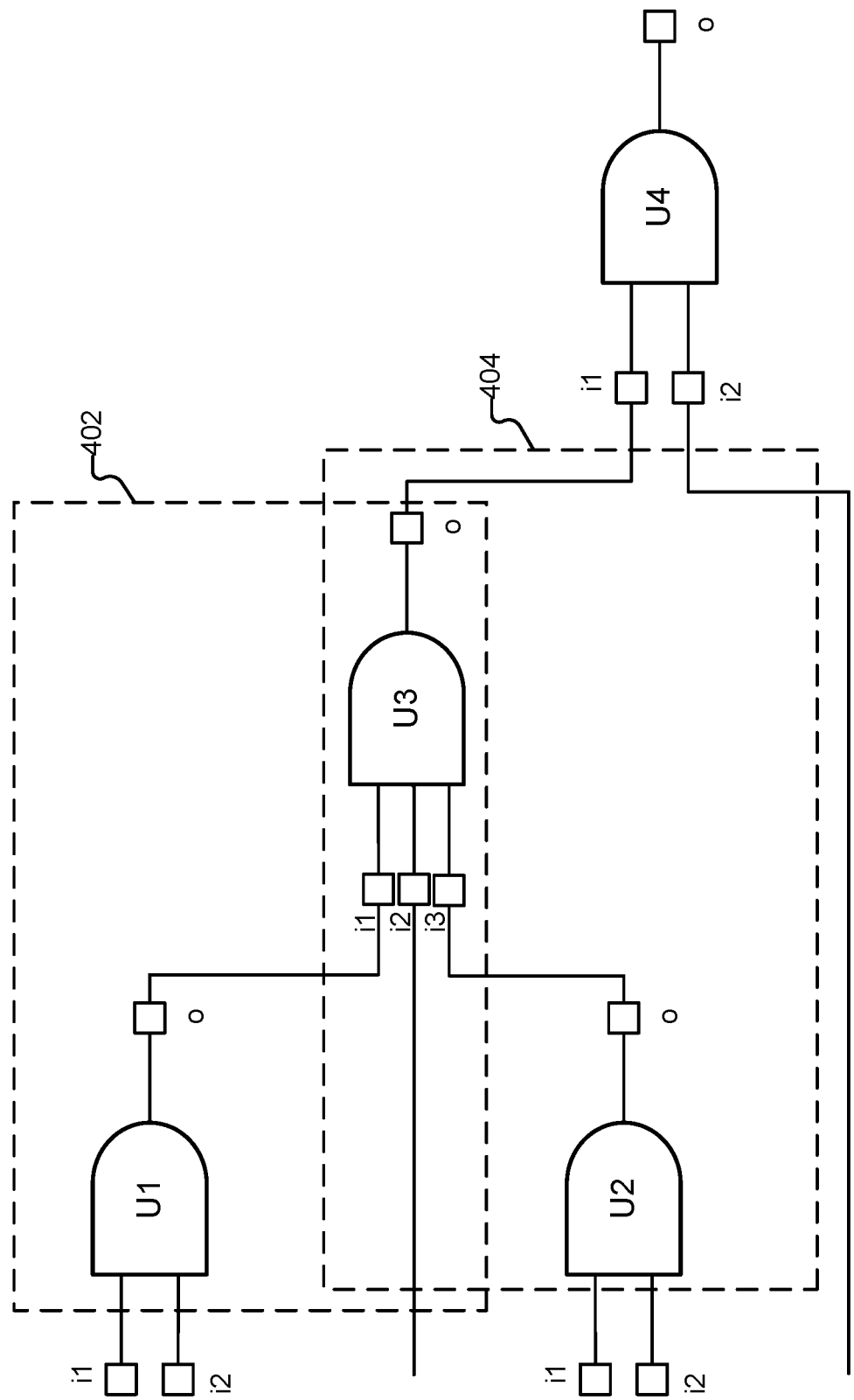
FIG. 5 is a diagram illustrating a localized partial simulation example.

FIG. 5 is a diagram illustrating a localized partial simulation example. In this example, multiple OPT moves are possible. For example, U1 can be upsized, and U2 can be downsized. Thus, multiple localized window areas are specified. Localized window area 402 is specified to include U1 and an affected gate U3. Localized window area 404 is specified to include U2 and an affected gate U3. In both cases, the localized window areas are kept small, therefore even though U4 may be affected by the changes, it is not considered in the initial window selection. The events generated from within the localized window may be further propagated through the fanout cone. Consequently, U4 will only be evaluated if it receives a propagated event at one of its inputs that will result in delay or value change at its output. Simulation is run as an interactive process on the localized window areas, and one or more optimization moves are selected. Specifically, one or more optimization moves that result in a desired amount of power improvement are selected, and the rest of the optimization moves are discarded. In some embodiments, if both optimization moves result in power improvement, the relative amounts of improvement are compared, and the move that resulted in greater improvement is kept. A next optimization-simulation iteration can include a greater window area.

The simulations are event-driven. The simulator schedules the events and evaluates them until all the events are processed. The events are timed and sequenced. For example, suppose at t=4, there is an event e1 that occurs at input pin 1 of a gate G1. The gate has a delay of 3. Therefore, at time t=4+3, there is another event e2 that occurs at output pin 2 of the same gate. Further, at t=5, there is an event e3 at pin 1 of a gate G2. These events need to be sorted so they occur at the right time in the right order (that is, in the order of e1, e3, e2). The typical implementation of simulator uses a list of events, which is expensive as there can be billions of events to sort and maintain.

Figure 6:
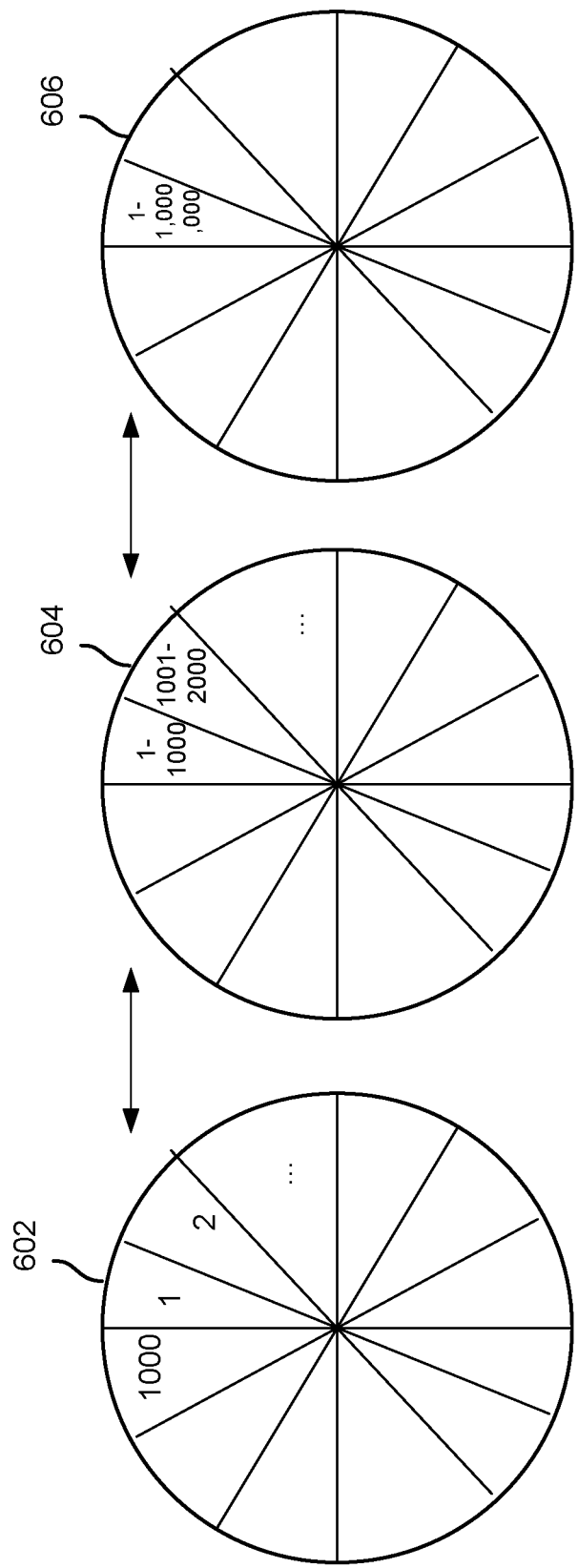
FIG. 6 is a diagram illustrating an embodiment of a hierarchical time wheel implementation for maintaining simulation events.

FIG. 6 is a diagram illustrating an embodiment of a hierarchical time wheel implementation for maintaining simulation events.

Time wheels 602-606 are organized in a hierarchical structure. At the lowest level is main wheel 602, the next level is super time wheel 604, and the top level is future wheel 606. Other/additional structures can be used in other embodiments. Each slot on the main time wheel 602 corresponds to one unit of time, and is used to store events occurring at that time. Each slot on super time wheel 604 represents an entire main wheel. Each slot on future wheel 606 represents an entire super time wheel. For example, a main time wheel can have 1,000 slots representing time units 1-1,000. Each slot is used to store events that are to occur during the corresponding time cycle. A super time wheel also has 1,000 slots and has storage that corresponds to 1,000 main time wheels for events occurring during time units 1-1,000,000. A future time wheel also has 1,000 slots and has storage that corresponds to 1,000 super time wheels, for events occurring during time units 1-1,000,000,000. Different number of slots and number of hierarchical levels can be used in other embodiments.

As the simulator runs, the main wheel turns, and events are pulled off from the slot representing the current time on the main wheel and processed. When all the events in a current slot are processed, the main wheel turns again to make the next slot current. An event can lead to future events, and such future events are placed at the corresponding slots on the main wheel. For example, the main time wheel is currently at slot 100 (100 time units), and an event being processed corresponds to an input to a gate with a delay of 2 time units. This event can lead to two additional events at time 102. These events are therefore added to the main time wheel at slot 102 (time 102). If an event is generated for a time so far into the future that the main time wheel does not have a slot that can store it (e.g., at time unit 1100), the main time wheel will pass this event on to the super time wheel to be placed into the appropriate slot (e.g., the slot corresponding to time units 1001-2000). In this way, the super time wheel acts as an overflow for the main time wheel. Similarly, the future wheel acts as an overflow for the super time wheel. When the main wheel finishes a turn, all the events should be processed. When all the events on the main time wheel are processed and the slots are empty, the events stored in the next slot on the super time wheel are transferred to the main time wheel, placed in the appropriate slot on the main time wheel to be processed. By using the hierarchical time wheels, the events can be stored without having to be sorted, and there is guaranteed to be sufficient storage space for all the events in practice. Two multi-threaded caches can be used to handle the events coming in and the events going out.

In another aspect, the simulator implements a multi-threaded simulation event scheduler. The circuit is partitioned to be processed by multiple threads. The partitions are done in a way that minimizes inter-partition communication and synchronization. In particular, the circuit is partitioned into submodules, where each submodule can be processed by a separate thread. Circuits in the submodules are examined for synchronization and dependency relationships. In some embodiments, this is done by checking the fanout of each element, and determining how the element affects other modules. If there are too many dependency relationships, the processing of one submodule can be delayed as it needs to wait for another dependent submodule to finish being processed. The submodules are regrouped if the number of dependencies exceeds a prespecified threshold.

Some dependency and synchronization may be inevitable. For example, suppose that thread 1 and thread 2 are processing events for separate submodules at time cycle t. Thread 2 has finished processing its current events and is ready to process events in time cycle t+1, while thread 1 is still processing events in time cycle t. Because thread 2 needs an input from thread 1, thread 2 needs to wait for thread 1 to finish processing.

In some embodiments, the simulator operates in a synchronous mode, where a manager thread controls the simulation clock, constantly checks the statuses of the threads, and turns the time wheel to obtain events when appropriate. Take the example above, the manager thread will turn the main time wheel to the slot corresponding to t+1 when all the threads have finished processing events at time t1. When all the events in the t+1 slot are processed, the manager thread turns the main time wheel again to t+2, and so on.

In some embodiments, the simulator operates in an asynchronous mode, where any thread can perform the management task. For example, when thread 2 is finished with processing events in t, it will check with other threads to determine if there are still threads processing events for time t. If no, thread 2 will turn the time wheel to t+1 to make the events available for processing; otherwise, thread 2 will wait for other threads to finish processing.

An integrated signoff tool has been described. By integrating the simulator with the optimizer, and allowing incremental and local simulations, the speed of the simulation process itself as well as the signoff process as a whole are both greatly accelerated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
access circuit information of a circuit;
perform, using an analysis and optimization engine, power analysis and optimization on the circuit to generate an optimized circuit, the power analysis and optimization being performed using an input pattern;
perform, using a simulator, a simulation on at least a portion of an optimized circuit, the simulation being performed using the input pattern used in the power analysis and optimization; and
output a simulation result to the analysis and optimization engine;
wherein the analysis and optimization engine and the simulator are integrated; and
one or more memories coupled to the one or more processors, configured to provide the one or more processors with instructions.

2. The system of claim 1, wherein the analysis and optimization engine communicates with the simulator via application programming interfaces (APIs).

3. The system of claim 1, wherein the input pattern is extracted from an initial project data associated with the circuit, derived from the initial project data associated with the circuit, or generated as a randomized pattern.

4. The system of claim 1, wherein the input pattern is a randomized pattern whose characteristics are determined based on a circuit type associated with the circuit.

5. The system of claim 1, wherein:
the input pattern is a randomized pattern whose characteristics are determined based on a circuit type associated with the circuit; and
the circuit type is determined by analyzing the circuit or specified by a user via a user interface.

6. The system of claim 1, wherein the simulation is performed incrementally in time, area, or both.

7. The system of claim 1, wherein to perform the simulation includes to:
define a plurality of localized window areas corresponding to respective ones of a plurality of optimization moves;
perform a plurality of simulations corresponding to the plurality of localized window areas; and
select one or more optimization moves among the plurality of optimization moves based on results of the plurality of simulations.

8. The system of claim 1, where the simulation is event-driven.

9. The system of claim 1, where the simulation is event-driven, and simulation events are stored on a hierarchical set of time wheels.

10. The system of claim 1, wherein in response to an anti-event, the simulator is configured to invalidate a previous event specified by the anti-event.

11. The system of claim 1, wherein the simulation is performed by multiple threads.

12. A method, comprising:
accessing circuit information of a circuit;
performing, using an analysis and optimization engine, power analysis and optimization on the circuit to generate an optimized circuit, the power analysis and optimization being performed using an input pattern;
performing, using a simulator, a simulation on at least a portion of an optimized circuit, the simulation being performed using the input pattern used in the power analysis and optimization; and
outputting a simulation result to the analysis and optimization engine; wherein the analysis and optimization engine and the simulator are integrated.

13. The method of claim 12, wherein the analysis and optimization engine communicates with the simulator via application programming interfaces (APIs).

14. The method of claim 12, wherein the input pattern is extracted from an initial project data associated with the circuit, derived from the initial project data associated with the circuit, or generated as a randomized pattern.

15. The method of claim 12, wherein the input pattern is a randomized pattern whose characteristics are determined based on a circuit type associated with the circuit.

16. The method of claim 12, wherein:
the input pattern is a randomized pattern whose characteristics are determined based on a circuit type associated with the circuit; and
the circuit type is determined by analyzing the circuit or specified by a user via a user interface.

17. The method of claim 12, wherein the simulation is performed incrementally in time, area, or both.

18. The method of claim 12, wherein performing the simulation includes:
defining a plurality of localized window areas corresponding to respective ones of a plurality of optimization moves;
performing a plurality of simulations corresponding to the plurality of localized window areas; and
selecting one or more optimization moves among the plurality of optimization moves based on results of the plurality of simulations.

19. The method of claim 12, where the simulation is event-driven.

20. The method of claim 12, where the simulation is event-driven, and simulation events are stored on a hierarchical set of time wheels.

21. The method of claim 12, wherein in response to an anti-event, the simulator is configured to invalidate a previous event specified by the anti-event.

22. The method of claim 12, wherein the simulation is performed by multiple threads.

23. A computer program product embodied in a non-transitory computer readable medium and comprising computer instructions for:
accessing circuit information of a circuit;
performing, using an analysis and optimization engine, power analysis and optimization on the circuit to generate an optimized circuit, the power analysis and optimization being performed using an input pattern;
performing, using a simulator, a simulation on at least a portion of an optimized circuit, the simulation being performed using the input pattern used in the power analysis and optimization; and
outputting a simulation result to the analysis and optimization engine; wherein the analysis and optimization engine and the simulator are integrated.

* * * * *